United States Patent [19]
Kenney

[11] Patent Number: 5,689,936
[45] Date of Patent: *Nov. 25, 1997

[54] METHOD AND APPARATUS FOR MANUFACTURING TAGGED INFUSION PACKAGES

[75] Inventor: Alan George Kenney, Over, England

[73] Assignee: A.G. (Patents) Limited (British company), London, England

[*] Notice: The term of this patent shall not extend beyond the expiration date of Pat. No. 5,511,359.

[21] Appl. No.: 638,795

[22] Filed: Apr. 29, 1996

Related U.S. Application Data

[62] Division of Ser. No. 104,135, Oct. 12, 1993, Pat. No. 5,511,359.

[30] Foreign Application Priority Data

Feb. 14, 1991 [GB] United Kingdom ............ 9103156
Feb. 14, 1992 [WO] WIPO ............ PCT/GB92/00265

[51] Int. Cl.$^6$ ............ B65B 29/04; B65B 61/14
[52] U.S. Cl. ............ 53/413; 53/134.2
[58] Field of Search ............ 53/413, 134.2, 53/453, 454, 559, 560, 450, 553; 493/375, 376, 390

[56] References Cited

U.S. PATENT DOCUMENTS

| | | | |
|---|---|---|---|
| 2,457,216 | 12/1948 | Eaton | 53/134.2 |
| 2,861,403 | 11/1958 | Weisman | 53/413 |
| 2,987,857 | 6/1961 | Whelan | 53/413 |
| 3,191,355 | 6/1965 | Morpurgo | 53/134.2 |
| 4,961,301 | 10/1990 | Bonomelli | 53/413 |
| 5,135,762 | 8/1992 | Vernon | 53/413 |

FOREIGN PATENT DOCUMENTS

| | | | |
|---|---|---|---|
| 7112389 | 9/1971 | Netherlands. | |
| 772951 | 4/1957 | United Kingdom | 53/134.2 |

*Primary Examiner*—Daniel C. Crane
*Attorney, Agent, or Firm*—Charles E. Baxley, Esq.

[57] ABSTRACT

A method and apparatus for manufacturing tagged two-ply infusion packages. The string (14) forming the tags is supplied to a rotating drum (12) which has a plurality of pins (17) protruding from its periphery. The drum (12) is rotatably mounted so as to cooperate with a web (1) used to form at least one layer of the two-ply infusion package. As the drum (12) rotates the string (14) is guided around the pins (17). The web (1) is introduced to the drum (12) by a roller (29) and urged against it by a curved guide (30) to transfer the string from the periphery of the drum to the surface of the web (1). The guide (30) is heated so as to melt the thermoplastics coating on the web (1), whereby the string is attached lightly to the web by the combination of heat and pressure from the guide (30). The web (1) with the string (14) lightly attached thereto is then sealed to a second web on which an infusion material has been deposited by heat sealing rollers (8) to form a travelling two-ply web having infusion containing pockets (11). The individual packages are then cut from the travelling two-ply web by, for example, co-rotating cutting rollers defining the shape of the packages.

14 Claims, 3 Drawing Sheets

METHOD AND APPARATUS FOR MANUFACTURING TAGGED INFUSION PACKAGES

This application is a division of application Ser. No. 08/104,135, filed Oct. 12, 1993, now U.S. Pat. No. 5,511,359.

The present invention relates to infusion packages and more particularly to a method of and apparatus for manufacturing tagged infusion packages, for example tea bags of the "one cup" variety. By a tagged infusion package is meant an infusion package having a tag which is secured to the package, for example, at the periphery of the package, and which has a portion intended to be gripped by a user.

Several methods are presently used for manufacturing tagged tea bags. In one method, a web of material is dosed with measured amounts of tea, its longitudinal edges folded together and sealed, and the infusion containing tube so formed then cut transversely into lengths. The opposed ends of these lengths are then brought together, folded over to seal the package and then stapled to hold the package shut. The staple also acts to secure a tag to the package. This method however is very slow and is not easily adapted to high production rates.

In a further method, a web of material is also dosed with discrete piles of infusion, and folded about its longitudinal axis, into a two-ply web. However, instead of sealing the longitudinal edge of the folded web, it is then sealed transversely at regular intervals to define a plurality of infusion containing pockets, each with an open edge. Tags are then introduced into the open edges of the pockets which are then sealed to close the packages and secure the tags, the web then being cut transversely to form individual rectangular packages. This method, however necessitates a lateral edge of the web being unsealed to receive a tag, which may not always be possible, depending on the shape of the packet to be produced.

In yet a further method, a web is dosed with infusion and first folded about its longitudinal axis and its edges sealed together to form a tube, the tube thereafter being sealed transversely at regular intervals to form a plurality of sealed pockets containing infusion. A continuous string is then laid on the web and secured to alternate transverse seals by adhesive stickers which also serve to secure a tag to the string. Alternate pockets are then folded to lie on top of each other and are sealed together at those seals holding the adhesive stickers, where they are cut laterally to form individual double chambered rectangular packages. The act of folding the pockets on top of each other wraps the string around the outside the forming package, and as the packages are cut, the string and adhesive sticker are cut such that one end of the string is secured to one side of the upper edge of the package by part of one adhesive sticker and the other end of the string, to which the tag is connected, is lightly secured to the other side of the upper edge of the package by part of the successive sticker. Such a process is, however, mechanically very complicated and is applicable only to the production of substantially rectangular packages.

The present invention seeks to provide an improved method of and apparatus for producing tagged infusion packages.

Viewed from a first aspect the invention provides a method of manufacturing tagged infusion packages, comprising forming a two-ply web having a succession of infusion containing pockets defined therein and cutting the pockets from the web to form packages of predetermined shape, the method further comprising positioning tags on the web and attaching them thereto in such a way that prior to said cutting each tag is located on an associated pocket with an attachment point for the tag and at least a gripping portion of the tag and a part thereof which extends between the gripping portion and attachment point all lying entirely within the periphery of the package to be formed from said pocket.

Viewed from a second aspect the invention provides apparatus for manufacturing tagged infusion packages, comprising means for forming a travelling two-ply web having a succession of infusion containing pockets defined therein, means for cutting said pockets from the web to form packages of predetermined shape, and means for positioning tags on the web and attaching them thereto in such a way that prior to said cutting each tag is located on an associated pocket with an attachment point for the tag and at least a gripping portion of the tag and a part thereof which extends between the gripping portion and attachment point all lying entirely within the periphery of the package to be formed from said pocket.

In accordance with the invention packages of a desired shape, e.g. round packages, may therefore be cut from the web by cutting means having a continuous cutting edge defining the predetermined shape and adapted to form a continuous cut around the infusion containing pocket without severing the tag between its gripping portion and associated attachment point. This represents a new departure from known tagging process which are in practice only suitable for producing generally rectilinear packages. Moreover, a process and apparatus in accordance with the invention may be mechanically less complicated than known techniques and higher production rates may be achieved.

The cutting means preferably includes a cutting edge configured to provide a continuous cut around each pocket to define the whole predetermined shape of the package. For example cutting edges having the desired profile may be provided on the surface of a cutting roller, as described in our earlier U.S. Pat. No. 5,233,813, the disclosure of which is incorporated herein by reference. However, other suitable cutting means such as a cooperating punch and die can also be used.

The two-ply web will be formed of first and second webs suitably joined together to define peripheral sealing around the infusion containing pockets. Although it can be envisaged that the tag may be located on the first web after it has been joined to the second web, it is preferred that this occurs upstream of where the webs are joined. This is particularly advantageous since it will allow the attachment points for the tags to be formed in the seal between the first and second webs formed around each pocket during the joining process and may obviate the need for any additional attachment means.

To strengthen the retention of the tag in the seal area, if required however, a patch may be adhesively secured to the infusion package over the attachment point. This may be done at any time after the tag is located on the first web, and preferably it is done after the packages have been cut from the travelling web. In such a case, the package may still be transported by the surrounding portion of the travelling web. The patch may be adhered to the package in any convenient manner, for example by an adhesive backing or by heat sealing. In one embodiment, patches are cut from a continuous tape and retained by vacuum on a rotating drum which cooperates with the packages to secure the patches thereto.

In one particularly preferred embodiment of the invention, the first and second webs are coated with a thermoplastic material, whereby they may be heat sealed together, for example using cooperating heating rollers, as is common in the art. Furthermore, by locating the tags on the first web prior to forming the two-ply web, it allows existing machinery used for producing untagged packages to be easily converted or adapted. The location of the tag on one web can then be accommodated as a preliminary step in the supply of a web to the sealing means, for example. It should be appreciated of course that the first and second webs may be separate webs or adjacent portions of a single web which are folded together to form the two-ply web.

Preferably each tag comprises a string member having one end secured to the package at an attachment point and the other end intended to be gripped by a user. Advantageously a tab made of paper, for example, is attached to said other end to facilitate gripping of the string. As applied to the web, this tab may extend outside the periphery of the final package shape and be cut to a desired shape as the package is cut from the web. It should be appreciated that the term string is intended to cover any thread or ribbon like member irrespective of its material of manufacture.

To facilitate manufacture, the string member may be located on the web as a continuous length, and cut into individual tags by the cutting means as said means cuts the packages from the two-ply web.

Normally the tag provided on an infusion package is substantially longer than the maximum dimension of the package. Such a tag may be accommodated on a package manufactured in accordance with the present invention by locating the string member on the web in a folded manner. The string member and tab are preferably releasably adhered in a desired configuration to the surface of each pocket so as to be retained in place between the locating and cutting steps, and also, optionally, after the package has been severed from the web so that the package may be supplied with its tab and string neatly engaged with one of its surfaces but readily releasable therefrom for use.

A preferred device for forming the string in such a manner comprises a plurality of supports, each support being provided on the periphery of a drum which is rotatably mounted so as to cooperate with the web. The supports are rotatable about respective axes extending radially of said drum, and comprise a plurality of pins, around which said string is wound into the desired shape by rotation of the supports about said axes. As the drum rotates, successive supports are moved into cooperation with the web as it is guided past the drum, to transfer the string to the web. Of course a single support only may be provided if appropriate.

In a preferred construction, the pins are retractably mounted on the supports, so that they do not penetrate the web as the string is transferred thereto. This also allows the provision of a heating plate against which the supports may press, through said web, to locate the string and tab on the web by melting of the thermoplastic coating on the web whereby the string and tab became lightly adhered to the web as mentioned.

The string is preferably secured to said supports as the drum rotates by hook members which are located on said drum between adjacent supports and which are arranged to grip and locate the string. This may be achieved in a particularly simple embodiment by the hook members being retractable into the drum.

As stated above, it is preferred that the attachment point for the tag is formed in the seal between the first and second webs. In the embodiment described above, the hook members may be arranged so as to penetrate the web to push a loop of string through the web and then to withdraw from the web while leaving the loop projecting through the web. This loop may then be secured in the seal formed around the infusion containing pockets.

It will be appreciated that the invention also extends to a tagged infusion package made by a method according to the invention or using apparatus according to the invention. Also, from a further aspect the invention provides an infusion package having a tag attached thereto at an attachment point, said tag having a gripping portion, the portion of the tag between the gripping portion and the attachment point lying entirely within the periphery of the package.

The tag, which may consist of a string and tab, is preferably attached to the package in the seal between the webs. It may be releasably adhered to the surface of the package in a desired configuration.

From a further aspect the invention provides a method of manufacturing tagged infusion packages, comprising forming a two-ply web having a succession of infusion containing pockets defined therein and cutting the pockets from the web to form packages, further comprising locating a tag string on a first web with a portion of said string extending through said web, and sealing a second web to said first web so as to form said two-ply web, the position of said portion of said string extending through said first web being such that upon sealing said first and second webs one to another, said portion is retained in a sealed portion of said two-ply web.

From a yet further aspect the invention provides apparatus for manufacturing tagged infusion packages comprising means for sealing first and second webs together to form a travelling two-ply web having a succession of infusion containing pockets defined therein, means for cutting said pockets from the web to form packages of predetermined shape, and means for positioning a tag string on said first web with a portion thereof extending through the web in such a position that upon sealing said first and second webs together, said portion of said string will be retained in a sealed region of said two-ply web.

A preferred embodiment of the invention will now be described, by way of example only, with reference to the following drawings in which.

Figure 1:
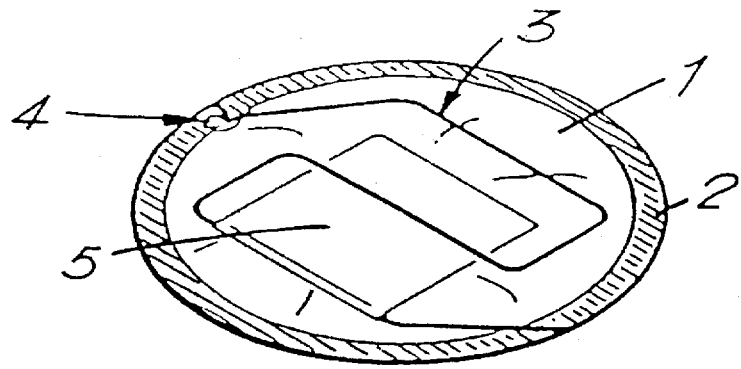
FIG. 1 shows a tea bag produced in accordance with the invention.
Figure 2:
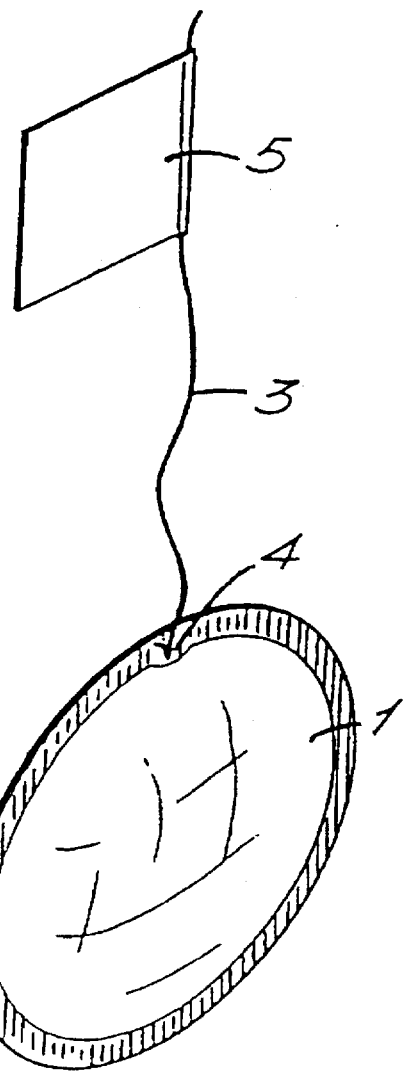
FIG. 2 shows the tea bag of FIG. 1 with the tab released from the bag surface.

Referring to FIG. 1, a circular tagged tea bag comprises a first, upper web of a porous, thermoplastic coated tissue material 1 that is attached by heat sealing to a similar second lower, web 6 of the same size and shape, with a seal of roughly uniform width that follows its entire periphery 2. A length of string 3 on the outside of the bag is incorporated in the seal by virtue of a small loop 4 that passes through the upper web so that it is trapped within the seal, as will be described later. A tab 5 made of paper or similar material is attached to the string 3 near its free end. The remainder of the string 3 is attached lightly to the bag so that it lies within the bag diameter as will be described below. To use the bag the majority of the string 3 is pulled from the bag using the tab 5. The other end of the string, however, remains firmly attached to the bag at an attachment point on its periphery as shown in FIG. 1a.

Figure 3:
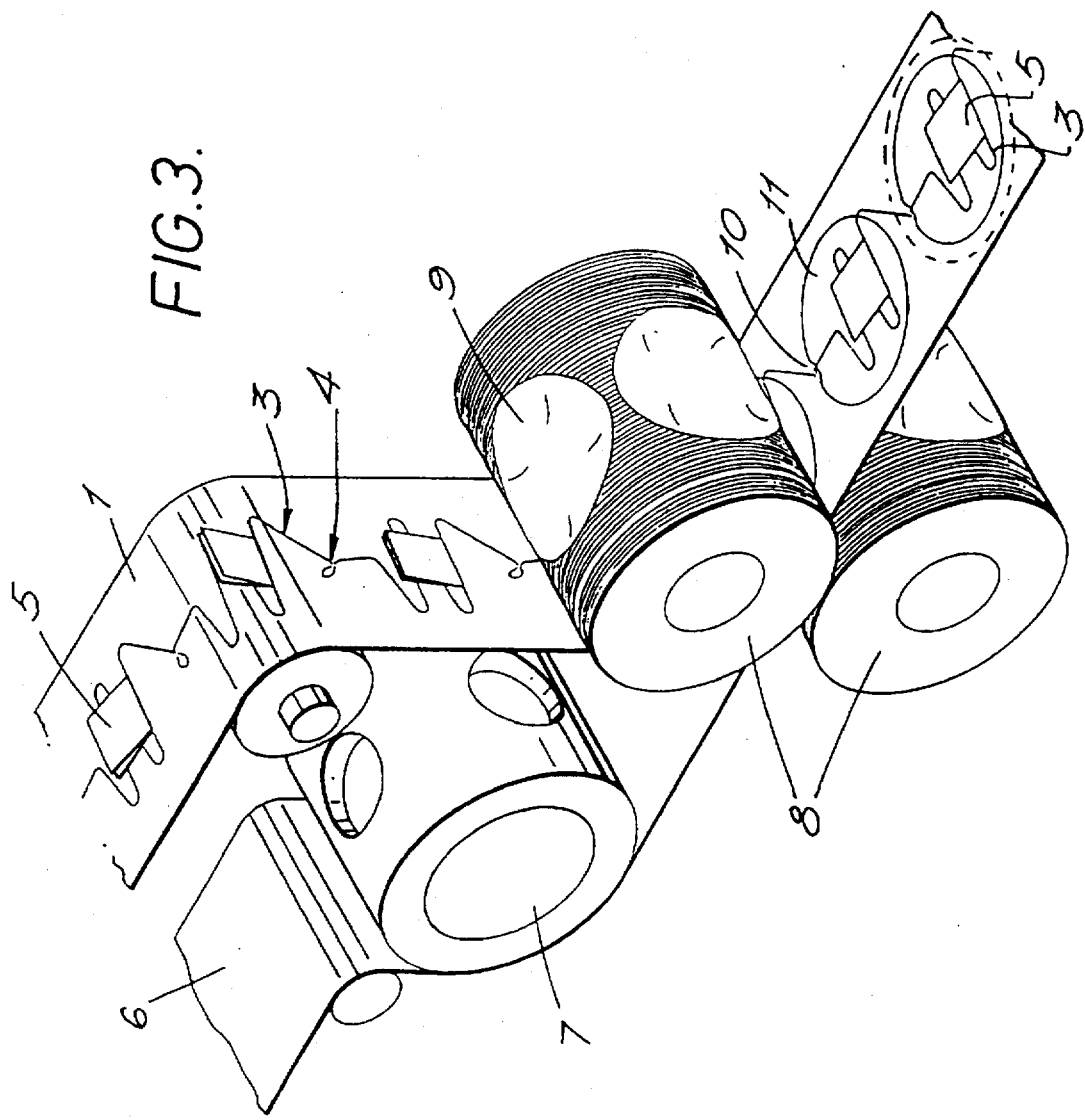
FIG. 3 shows apparatus for performing an intermediate step in a method embodying the invention.
Figure 4:
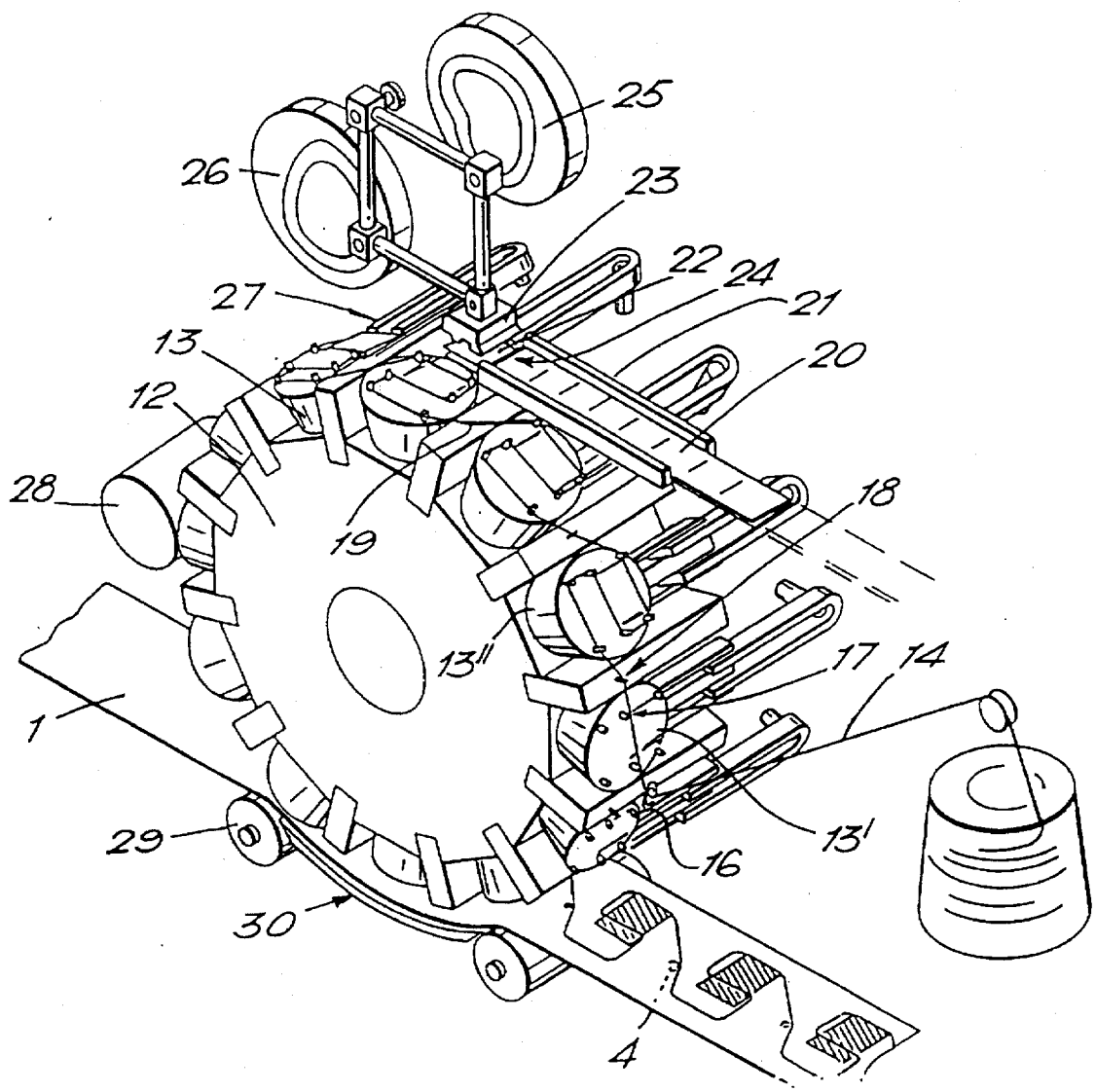
FIG. 4 shows apparatus for performing another step in a method embodying the invention.

Manufacture of bags is shown in FIGS. 3 and 4. With reference firstly to FIG. 3, the continuously travelling upper web 1 has attached to its upper surface a continuous length of string 3 that follows a convoluted path. At intervals that correspond to the pitch of the finished bags a small loop of string 4 is inserted through the web. At the same interval, but in a different position, tabs 5 are attached to the string. This process will be described in greater detail below with reference to FIG. 4.

The lower web 6 passes beneath a dosing roller 7 that deposits measured quantities of tea on the upper surface of the web 6. The upper and lower webs 1, 6 are then brought together as they pass between heated sealing rollers 8. The heat melts the thermoplastic coating on the webs 1, 6, to seal the webs together under pressure. Pockets 9 in the sealing rollers form closed pouches or bags of the desired shape, for example circular as shown. As the seal is formed the loop 4 is trapped within the sealed area and firmly attached to both webs. The dimensions of the seal may be increased around the attachment point 10 so as to strengthen the attachment of the string 3. The travelling sealed web may then pass between cutting rollers operating on the same principle as those disclosed in our International Patent Application WO 90/13487, or other means (not shown) to cut the desired shape of bag from the web. The shape of the cut package is indicated in dotted lines in FIG. 3. At the same time the string is cut in two places to form the discrete string/tab/bag assemblies shown in FIG. 1.

If required, a patch (not shown) may be applied over the attachment point 10 so as further to increase the strength of the attachment of the string 3. Although this may be done at any time after the string is introduced onto the web, conveniently it is done after the packages have been cut from the travelling web. As is apparent from our U.S. Pat. No. 5,233,813, packages although cut from the web will be transported by it, so it is still possible to apply the patches to the packages as they move towards a packaging station. In one embodiment, a tape of patch material may be fed onto a rotating drum and cut into individual patches which are retained on the drum surface by vacuum, for example. The drum presses the patches against the packages as they move under the drum so as to secure them thereto, for example by an adhesive backing on the patch or by heat.

Apparatus for applying a string 3 and tab 5 to an upper web 1 is illustrated in FIG. 4. The particular convoluted configuration of the tag shown in FIG. 4 is different to that shown in FIG. 3. A rotating drum 12 carries a number of supports or blocks 13. Each block 13 is rotatable about an axis which is radial to the drum, for example under the control of cam means (not shown). String 14 from a bobbin 15 is fed through a tension control device 16 onto the blocks 13. As the drum 12 rotates the string 14 is guided around pins 17 protruding from the first block 13'. The string further engages needles 18 which protrude from the drum 12. Rotation of the drum 12 beyond a certain point causes the first block 13' to rotate about its own axis to draw the string around the pins 17 on its surface to form the desired convoluted shape, as shown on block 13". Each needle 18 is provided with hook means and is retractable into apertures 19 in the drum 12, to grip the string 14 in its hooked end within the drum 12 so that the string is trapped and located in its folded condition on the block 13". The block 13" will not rotate again until the drum returns to this position again.

To attach tabs 22 to the string 14, a continuous line of folded tabs 20 is first pulled along a track 21. Successive tabs 22 are severed from the continuous reel by a cutter 23 that moves against an anvil 24 under the control of cams 25 and 26. The motion of the cutter 23 is such that the tabs 22 are gradually introduced to pushers 27 on the continuously rotating drum 12. A further cam (not shown) causes the pusher 26 to slide the tab 22 onto the block 13 so that it straddles the string at a desired position. A heated roller 28 secures the tab 22 to the string by melting an adhesive coating on the tab. Alternatively, other forms of adhesive could be introduced to the tab.

To secure the tag to the upper web 1, the web is introduced to the drum 12 by a roller 29 and urged against it by a curved guide 30. The pins 17 are resiliently mounted in the blocks 13 so that they may retract into the blocks 13 under the action of the guide 30, while the string is pressed against the guide, retaining its desired convoluted shape. The guide 30 is heated so as to melt the thermoplastics coating on the web 1, whereby the string is attached lightly to the web by the combination of heat and pressure from the guide 30. At the same time the appropriate needle 18 extends to force the loop of string 4, which was formed when the needle 18 was retracted into the drum 12, through the web. After insertion the needle 18 retracts to leave the loop 4 in position beneath the web. As this process continues a continuous line of string/tab assemblies is deposited and secured to the web 1. The web 1 is then sealed to a second web as described above with reference to FIG. 3.

Since the string connecting each tab with its associated attachment point lies entirely within the periphery of the respective package, the integrity of each individual tag is maintained after the cutting step, whilst, as mentioned above, successive tags are separated from one another.

I claim:

1. Apparatus for manufacturing tagged infusion packages having tags comprising a string member attached to the package and having an end intended to be gripped by a user, comprising:

means for providing a travelling web;

means for forming a travelling two-ply web using said web as at least one layer thereof;

means for defining successive infusion containing pockets in said two-ply web;

means for cutting said pockets from said two-ply web to form packages of predetermined shape; and means for attaching said string members to the packages; wherein said means for attaching said string members to the packages includes:

a drum which is rotatably mounted so as to cooperate with said web or said two-ply web;

a plurality of pins provided on the periphery of the drum;

means for supplying string to the drum;

means for guiding the string around the pins; and means for transferring the string from the periphery of the drum to said cooperating web and attaching it thereto.

2. Apparatus as claimed in claim 1, wherein said pins are retractably mounted on said drum.

3. Apparatus as claimed in claim 1, further comprising a plurality of supports provided on the periphery of said drum, the plurality of pins being mounted on the supports; and wherein the means for guiding the string around the pins comprises means for moving the supports in such a manner that the string is guided around the pins.

4. Apparatus as claimed in claim 3, wherein said pins are retractably mounted on said supports.

5. Apparatus as claimed in claim 3, further comprising hook members which are located on said drum between adjacent supports and which are arranged to grip and locate the string, whereby said string is secured to said supports as the drum rotates.

6. Apparatus as claimed in claim 5, wherein said hook members are retractable into said drum.

7. Apparatus as claimed in claim 3, wherein the means for moving the supports comprises means for rotating the supports about respective axes extending radially of said drum whereby the string is guided around the pins by rotation of the supports about said axes.

8. A method for manufacturing tagged infusion packages having tags comprising a string member attached to the package and having an end intended to be gripped by a user, comprising:

provide a travelling web;

forming a travelling two-ply web using said web as at least one layer thereof:

defining successive infusion containing pockets in said two-ply web;

cutting said pockets from said two-ply web to form packages of predetermined shape; and attaching said string members to the packages; wherein said step of attaching said string members to the packages includes:

guiding string around a plurality of pins provided on the periphery of a drum which is rotatably mounted so as to cooperate with said web or said two-ply web; and transferring the string from the periphery of the drum to said cooperating web and attaching it thereto.

9. A method as claimed in claim 8, wherein said pins are retractably mounted on said drum.

10. A method as claimed in claim 8, wherein the plurality of pins are mounted on supports provided on the periphery of said drum; and the step of guiding the string around the pins comprises moving the supports in such a manner that the string is guided around the pins.

11. A method as claimed in claim 10, wherein said pins are retractably mounted on said supports.

12. A method as claimed in claim 10, further comprising securing the string to said supports as the drum rotates by means of hook members which are located on said drum between adjacent supports and which are arranged to grip and locate the string.

13. A method as claimed in claim 12, wherein said hook members are retractable into said drum.

14. A method as claimed in claim 10, wherein the step of moving the supports comprises rotating the supports about respective axes extending radially of said drum whereby the string is guided around the pins by rotation of the supports about said axes.

* * * * *